United States Patent [19]

Maarleveld

[11] 4,164,902
[45] Aug. 21, 1979

[54] FERMENTATION TANK

[75] Inventor: Adrianus Maarleveld, San Carlos, Calif.

[73] Assignee: Fleming-Potter Company, Inc., Peoria, Ill.

[21] Appl. No.: 940,113

[22] Filed: Sep. 6, 1978

[51] Int. Cl.² ............................................. C12G 1/02
[52] U.S. Cl. .................................. 99/277.1; 195/135; 210/209
[58] Field of Search .............. 99/275, 276, 277, 277.1, 99/277.2, 278, 323.1, 323.2; 195/127, 133, 134, 135, 103; 210/106, 107, 108, 331, 209, 297; 426/422

[56] References Cited

U.S. PATENT DOCUMENTS

| | | | |
|---|---|---|---|
| 159,450 | 2/1875 | Reford | 426/422 |
| 271,700 | 2/1883 | Garstang | 210/209 |
| 282,477 | 7/1883 | Wolf | 210/297 |
| 291,535 | 1/1884 | Rall | 210/209 |
| 482,790 | 9/1892 | Giesler | 210/209 |
| 755,144 | 3/1904 | Lapp | 195/101 |
| 763,606 | 6/1904 | Hettinger | 195/135 |
| 954,889 | 4/1910 | Schneible | 195/101 |
| 2,536,994 | 1/1951 | Cremaschi | 99/276 |
| 2,901,115 | 8/1959 | Schmidt | 210/331 |
| 2,916,421 | 12/1959 | Schwaiger | 195/135 |
| 3,169,109 | 2/1965 | Hirs | 210/107 |
| 3,823,655 | 7/1974 | Potter | 99/277 |
| 3,910,173 | 10/1975 | Zepponi | 99/277.1 |

Primary Examiner—Robert W. Jenkins
Attorney, Agent, or Firm—Allegretti, Newitt, Witcoff & McAndrews

[57] ABSTRACT

A wine fermentation tank includes a generally cylindrical outer tank with a top opening through which crushed grapes may be added to the tank. The bottom of the tank has a frusto-conical shape with a door and a fluid discharge tube at the lower apex of the tank bottom. A concentric screen fits within the tank to retain the crushed grapes and define a narrow annular space between the tank and screen. Juice from the grapes passes through the screen and then through openings in the outer tank wall for collection. A screen is also positioned over the bottom door. The tank wall openings are sized to insure even flow of juice from the tank through various outlets.

10 Claims, 5 Drawing Figures

FERMENTATION TANK

BACKGROUND OF THE INVENTION

This invention relates to an improved wine fermentation tank.

Heretofore various fermentation tank structures have been proposed for receipt of crushed grapes or other brewing ingredients and the manufacture of wine or other liquors requiring a fermentation process. Potter in U.S. Pat. No. 3,823,655 discloses a typical prior art tank especially useful for the manufacture of wine. The Potter patent discloses a generally cylindrical tank which includes a plurality of drain tubes extending into the tank from the bottom to withdraw juice from the tank. The drain tubes are maintained within a cylindrical filter screen to prevent the crushed grape pomace from clogging the drain tubes.

Other apparatus of this general nature are disclosed in Hettinger U.S. Pat. No. 763,606; Garstang U.S. Pat. No. 271,700; Schwaiger et al U.S. Pat. No. 2,916,421; Vacano U.S. Pat. No. 3,729,321; Huppmann U.S. Pat. No. 3,407,722; Hirs U.S. Pat. No. 3,169,109; Schmidt, Jr. et al U.S. Pat. No. 2,901,115; Schneible U.S. Pat. No. 954,889; Lapp U.S. Pat. No. 755,144; Rall U.S. Pat. No. 291,535; Giesler U.S. Pat. No. 482,790; Reford U.S. Pat. No. 159,450; and Wolf U.S. Pat. No. 282,477. Publications disclosing similar devices include a brochure disclosing a vessel or tank manufactured by Bignier Schmid-Laurent, a company located in France and an article at pages 54 and 55 of the September 1975 issue of Wines and Vines entitled "Cuvaison Juice Separator Uses Gravity, $CO_2$ to Preserve Juice Quality, Speed Processing".

The above-identified prior art disclosures and apparatus are believed to be effective. However, it is believed that an improved design for a fermentation tank which can be easily serviced and can additionally serve as a storage tank is desirable. Accordingly, the present invention was conceived.

SUMMARY OF THE INVENTION

Briefly, the present invention comprises an improved wine fermentation tank which includes an outer generally cylindrical tank having a frusto-conical bottom with a bottom discharge opening. An inner screen concentric with the outer tank wall is positioned within the tank. Discharge openings through the outer tank wall are provided to drain fluid or juice from brewing ingredients positioned within the concentric inner screen. A removable screen is also positioned over the bottom discharge opening. The bottom discharge opening includes a valved fluid discharge outlet as well as a solids outlet door. Various embodiments for the removable screen positioned over the discharge opening are disclosed. Various arrangements of lateral discharge openings in the outer tank wall are also disclosed.

Thus, it is an object of the present invention to provide an improved wine fermentation tank which may also serve as a storage tank.

Still a further object of the present invention is to provide a wine fermentation tank of economical and simple construction which may be easily assembled and disassembled for repair and cleaning.

Another object of the present invention is to provide a wine fermentation tank which has a minimum of projections to the interior of the tank.

A further object of the present invention is to provide a wine fermentation tank with removable screens which can be easily cleaned.

Another object of the present invention is to provide a wine fermentation tank with a perforated screen for containment of crushed grapes and wherein the pattern of screen perforations insures even fluid flow through the screen.

A further object of the present invention is to provide a wine fermentation tank adapted to be cleaned without removal of internal filter screens.

Still another object of the present invention is to provide a wine fermentation tank with a lower drain cooperative with a screen that is removable from either end of the tank.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
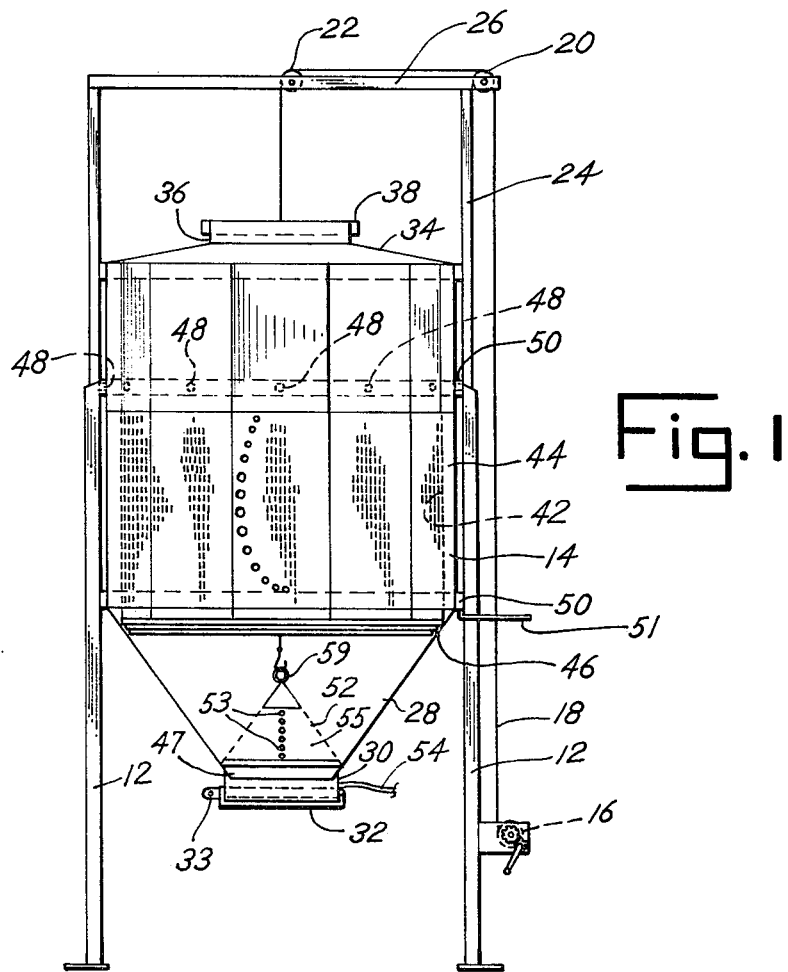
FIG. 1 is a side elevation of the improved fermentation tank of the present invention.
Figure 2:
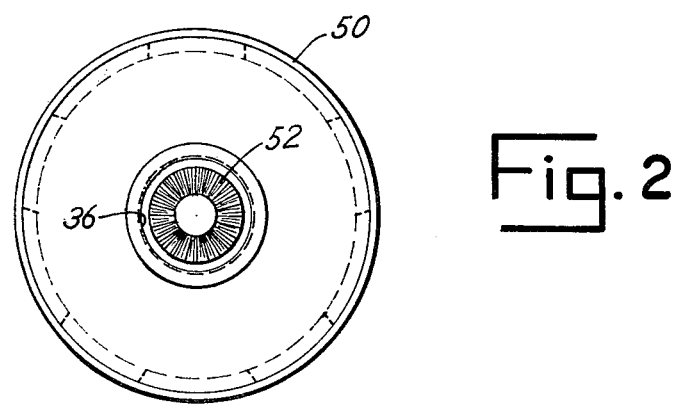
FIG. 2 is a top plan view of the tank shown in FIG. 1.

Referring first to FIGS. 1 and 2, the wine fermentation tank of the present invention is supported on vertical legs 12 arranged appropriately about the circumference of a cylindrical tank 14. A winch 16 is attached to the side of tank 14 for operation of a winch line 18 which extends over pulleys 20 and 22 to move various parts of the fermentation tank assembly. The pulleys 20 and 22 are attached to external brackets 24 and 26 which extend from the legs 12 to support the pulley and winch assembly associated with the tank 14.

The tank 14 is preferably cylindrical and terminates at its lower end with a frusto-conical bottom section 28. The frusto-conical bottom section 28 is inverted with the narrow end of the section 28 at the bottom of the tank assembly. The bottom section 28 terminates with a cylindrical flange 64 defining a circular opening 30. A door 32 is pivotally hinged to flange 64. The door 32 may be sealingly engaged with the opening 30 and held locked in position by a latching mechanism 33.

A top cover 34 fits over the top of the tank 14 and may be temporarily attached thereto by means of removable wing bolts or the like. The cover 34 includes a cylindrical opening 36 which, in turn, has a removable cover 38. The tank assembly including tank 14 is symmetrical about a center line axis 40 as illustrated in FIG. 2.

Positioned within the tank 14 is a perforated screen 42 which defines a narrow annular space 44 between the wall of the tank 14 and the screen 42. The screen 42 is sealingly engaged at its lower edge 46 with the frustoconical bottom section 28. The screen 42 extends from a lower edge 46 to the top of the tank 14 and includes perforations 43. The screen 42 is generally removable from the top of the tank 14. In a preferred embodiment, the screen 42, includes spaced and sized openings or perforations 43 arranged in a definite array.

That is, positioned at various horizontal levels in the wall of the tank 14 are discharge outlets 48. Those discharge outlets 48 on each horizontal plane are interconnected by means of an annular manifold 50 attached to the outside wall of tank 14. One manifold 50 is provided for each level of discharge outlets 48. A plurality of levels may be provided though the drawing (FIG. 1) illustrates only two levels of manifold 50.

The openings 43 are sized to insure even flow from all parts of the tank through screen 42 into the annular space 44 and manifolds 50. All openings 43 are also sized to prevent flow of crushed grapes, must and the like through the screen 42. Also perforations 43 are generally not provided above the plane of the uppermost manifold 50.

Finally, to prevent or minimize solids flow from the tank, each manifold 50 is provided with a single drain tube 51. The openings 48 in tank 14 connected with manifold 50 are sized to insure an even volume flow of juice from all parts of the channel or space 44 through tube 51. Thus openings 48 closest to the connection of tube 51 to manifold 50 are smaller than openings which are distant from the connection of tube 51.

A removable screen 52 is positioned in the bottom section 28 over the opening 30. The screen 52 may be of a desired shape to cover the opening 30. The screen 52 is above the level of a valved fluid or juice discharge tube 54 extending from the bottom section 28. Screen 52 also preferably includes openings 53 which, like openings 43, prevent flow of solids there through. Screen 52 includes an inverted frusto conical support rim 47 cooperative with bottom section 28. Screen 52 has an eyelet 59 which facilitates removal via winch line 18.

Figure 3:
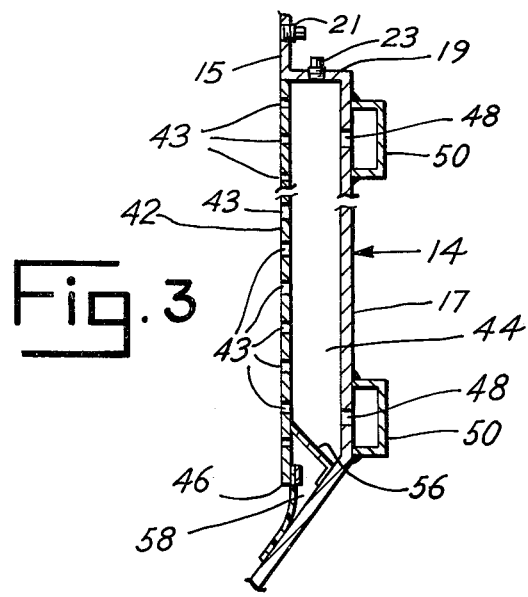
FIG. 3 is an enlarged, partial side, cross-sectional view of the tank and inner screen construction of the fermentation tank of the present invention illustrating, in part, an alternative embodiment.
Figure 4:
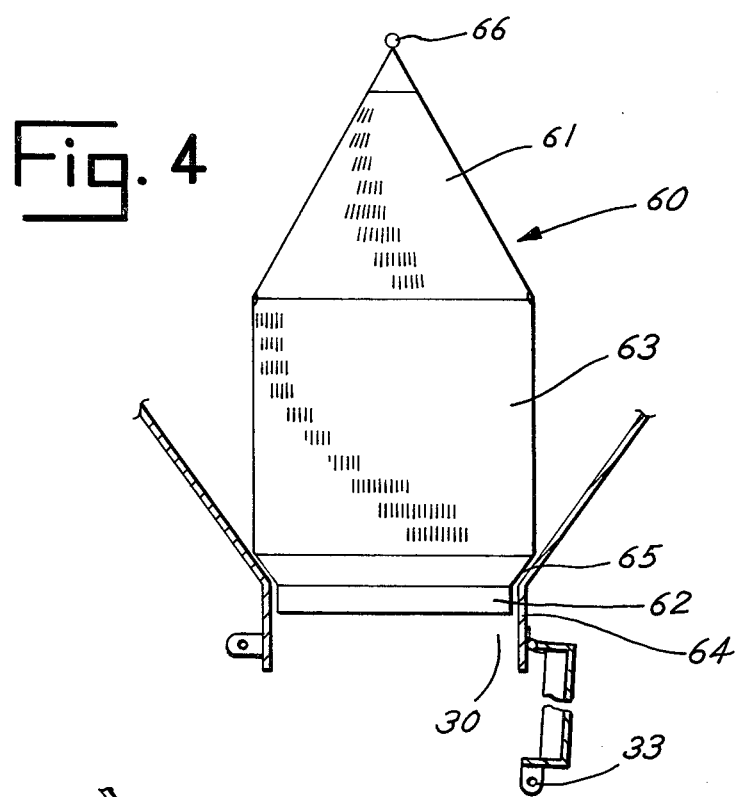
FIG. 4 is an enlarged side, cross-sectional view of a removable lower screen associated with the improved fermentation tank of the present invention.
Figure 5:
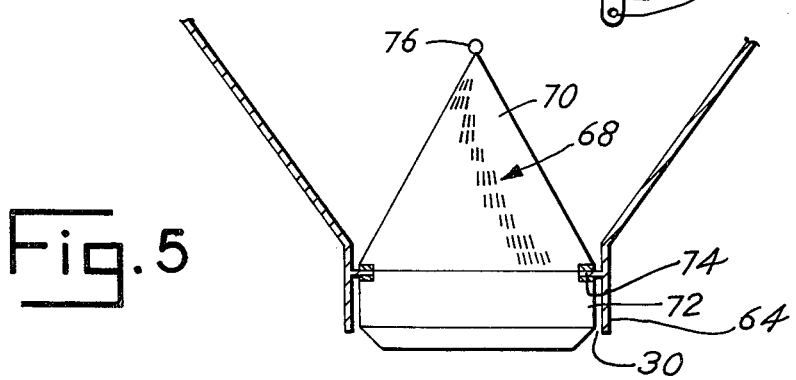
FIG. 5 is an enlarged side cross-sectional view of an alternative embodiment of the removable lower screen for the fermentation tank of the present invention.

FIGS. 3-5 illustrate in greater detail the various components heretofore described as well as some alternative constructions. Referring first to FIG. 3, there is illustrated the structure of the screen 42 and its seal with the tank 14 or bottom section 28. Also illustrated are the outlets 48 and manifold 50 associated with the tank wall 14. The lower edge 46 of the screen 42 is supported by a brace 56 attached thereto to support the screen 42 relative to the bottom section 28. A Teflon seal 58 extends downward from the bottom of the screen 42 and provides a leak-proof seal between the interior of the tank 14 and the annular space 44.

FIG. 3 also illustrates an alternative construction wherein the screen 42 is integrally incorporated in the tank 14. In this embodiment, the screen 42 is not removable from tank 14. That is, the wall of tank 14 is offset inwardly above the top most manifold 50 so that screen 42 defines a downward vertical extension of upper tank wall 15. Annular space 44 is then defined by the lower tank wall 17 in combination with screen 42. Lower tank wall 17 is connected with upper tank wall 15 by a circumferential flange or rim 19. Plug openings 21 and 23 are defined in wall 15 and flange 19 respectively. Openings 21 and 23 may be unplugged in order to flush and clean the tank 14 with water and steam. Note that a flushing operation will cause water to flow through the annular space 44 and under the flap 58 for draining from the bottom of tank 14.

Referring next to FIG. 4, there is illustrated an embodiment for an outlet screen 60 somewhat distinct from that shown in FIG. 1. In the embodiment of FIG. 4, the screen 60 has a cone shaped top 61, and a cylindrical midsection 63, which terminates with an inverted frustoconical rim 65 that is compatible with the bottom section 28. A lip member 62 extends about the lower periphery of rim 65 to insure alignment of the screen 60. The lip member 62 engages cylindrical flange 64 defining the opening 30. Screen 60 also includes an eyelet 66 at the apex of the cone 61 to which cable or line 18 may be attached to remove the screen 60 by means of the winch 14. Top 61 projects above the level of the lower manifold 50.

FIG. 5 illustrates another embodiment of a conical screen 68. Screen 68 is formed in two sections, an upper, perforated conical section 70 and a lower, unperforated attached cylindrical section 72. A collar 74 sealingly engages the flange 64. An eyelet 76 is provided at the apex of the conical section 70 for attachment of line 18 for support of screen 68 to facilitate removal of the screen 68 from the tank 14. Screen 68 may be removed by movement in either direction from the tank 14. It may be lowered or raised. With the embodiment of FIG. 5, a door 32 may not be required.

Preferably, the various components and materials used for the manufacture of the improved tank of the present invention are stainless steel. In fabricating the screen 42, it is possible to make the screen 42 by perforating the desired portion of the sheet and then forming a stainless steel sheet of material into a cylindrical shape. Preferably a part of the screen 42 remains unperforated, for example, the top one-third. In this manner, the inner screen 42 will have sufficient structural integrity to be able to support the weight of crushed grapes or the like which have been placed within the tank 14.

In operation, crushed grapes are pumped into the interior of the tank 14 within the screen 42. The bottom door 32 is maintained in a closed position and the conical screen 52 is positioned appropriately. After the crushed grape mixture "caps", i.e., when the seeds, skins and other solids ascend and form a cap at the top of the tank, the juice is drawn off through the perforations 43 in the screen 42 and lateral openings 48 in tank 14. Initially, the juice is drained from the openings 48. As the level of the material within the tank descends below the openings 48, juice passes through the screen 52 and is drawn off through the tube 54. Subsequent to draining all of the juice from the tank 14, the screen 52 is raised and the door 32 is opened so that the skins, etc. (pomace) may be dumped.

Utilizing a tank construction of the afore-described type, recovery of 138 gallons per ton of crushed grapes has been made with an average of 1.5 percent solids in the juice extracted. This figure compares with a value of about 110 to 120 gallons per ton of crushed grapes achieved with prior art devices and which is normally considered quite good.

The embodiment for the screen shown in FIG. 5 has been found to further increase the yield of juice per ton of grapes. The tank as described, therefore, serves the functions of dejuicing grape must to obtain a maximum free run amount of juice with the lowest possible amount of solid content. With the tank of the present invention it is possible to ferment grape must and extract the juice after fermentation and to evacuate the pomace without manually entering the tank. When not being used as a fermentation tank, the tank can serve as a storage tank. Finally, the tank is easily disassembled for cleaning and/or repair.

With respect to the construction of the screens 52, 60 and 68, it is noted that screen 52 is, perhaps, the general purpose structure for wine fermentation processes. Screen 60 in FIG. 4 is used for grapes having a heavy cap, for instance fermented reds. The top or cone 61 penetrates the heavy cap prior to the level of must descending lower than the lowest manifold 50 and avoids airlock when further draining through tube 54.

The screen 68 in FIG. 5 is used to permit interrupted flow of solids. That is, the screen 68 may be raised and lowered to control solids flow from the tank 14.

While there has been set forth a preferred embodiment of the invention, the invention is to be limited only by the following claims and their equivalents.

What is claimed is:

1. An improved wine fermentation tank comprising, in combination:
    an outer tank having a generally cylindrical side wall, a top opening and a convergent bottom wall having a generally inverted frusto-conical shape defining a bottom discharge opening at the bottom of the tank;
    an inner screen concentric with the outer tank wall defining a cavity for receipt of crushed grapes, said inner screen forming a narrow annular channel between the inner screen and the tank, said inner screen being sealed at its lower end against the tank to define a region for receipt of juice from the crushed grapes;
    at least one side discharge opening in the tank side wall above the convergent bottom wall for receipt of juice from the annular channel; and
    a removable screen positioned over the bottom discharge opening, said bottom discharge opening including a fluid discharge outlet and a solids outlet door.

2. The improved wine fermentation tank of claim 1 wherein said inner screen is removable from the tank.

3. The improved wine fermentation tank of claim 1 including a plurality of side discharge openings through the outer tank wall and means to interconnect said side discharge openings.

4. The improved wine fermentation tank of claim 1 including a plurality of side discharge openings through the side wall, at least two of said openings lying in a plane generally perpendicular to the vertical axis of the tank.

5. The improved wine fermentation tank of claim 1 including a plurality of side discharge openings through the side wall, said openings defining a plurality of horizontal planes and a discharge manifold for the tank in each plane connected with the openings of that plane.

6. The improved wine fermentation tank of claim 5 including a discharge tube from each manifold and wherein the tank openings connected with the manifold are sized to insure uniform volume flow from the tank openings through the manifold.

7. The improved wine fermentation tank of claim 6 including a discharge tube from each manifold and wherein the tank openings connected with the manifold distant from the tube are larger than the openings near the tube.

8. The improved wine fermentation tank of claim 1 wherein said removable screen is conical.

9. The improved wine fermentation tank of claim 1 wherein said removable screen projects above a side discharge opening.

10. The improved wine fermentation tank of claim 1 wherein said inner screen is fixed to the tank.

* * * * *